United States Patent
Roberts et al.

(12)

(10) Patent No.: US 6,654,411 B1
(45) Date of Patent: Nov. 25, 2003

(54) METHOD AND SYSTEM FOR ESTIMATING ERROR RATE OF A COMMUNICATION CHANNEL OVER A WIDE DYNAMIC RANGE

(75) Inventors: Kim B. Roberts, Nepean (CA); Wolfgang W. Oberhammer, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/472,912

(22) Filed: Dec. 27, 1999

(51) Int. Cl.[7] .......................... H04B 17/00; H04B 3/46; H04Q 1/20

(52) U.S. Cl. ........................ 375/225; 375/227; 714/801

(58) Field of Search ................................. 375/225, 227, 375/354, 355; 370/503; 714/61, 758, 799, 800, 801, 803, 804, 805

(56) References Cited

U.S. PATENT DOCUMENTS

| | | | | |
|---|---|---|---|---|
| 5,432,800 A | * | 7/1995 | Kuroda et al. | 714/758 |
| 6,073,250 A | * | 6/2000 | Luby et al. | 714/6 |
| 6,243,847 B1 | * | 6/2001 | McClellan et al. | 714/800 |
| 6,282,690 B1 | * | 8/2001 | McClellan et al. | 714/801 |

* cited by examiner

Primary Examiner—Phoung Phu

(57) ABSTRACT

At a transmitter, a measurement array is constructed from various combinations of frame bits, including at least one combination Which includes many frame bits and at least one combination which includes only a few frame bits. The measurement array is transmitted along with the frame bits. Upon receipt of the frame at a receiver, a parity check is performed on the received frame bits and on the measurement array, resulting in the creation of a symptomatic array. The symptomatic array can be accumulated during the course of successive frames. After a sufficiently high number of frames, it will become clear from the values of the elements in the accumulated symptomatic array which bits in the symptomatic array are saturated and which are not. The accumulated symptomatic array is then mapped to a BER estimate.

63 Claims, 7 Drawing Sheets

METHOD AND SYSTEM FOR ESTIMATING ERROR RATE OF A COMMUNICATION CHANNEL OVER A WIDE DYNAMIC RANGE

FIELD OF THE INVENTION

The present invention relates generally to digital communications systems and, more particularly, to a method and system for estimating the bit error rate (BER) in such systems when the actual BER may have a wide dynamic range.

BACKGROUND OF THE INVENTION

Typically, the communication channel across which a digital signal is transmitted will cause corruption of the signal to some degree. The ratio of corrupted bits to total transmitted bits is known as the bit error rate, abbreviated BER. Generally, it is rare to find a communication channel that has a BER of less than $10^{-16}$. Thus, a finite bit error rate will affect information travelling on virtually any communication channel.

The public's ever increasing thirst for high-rate data services has resulted in a demand for increased reliability associated with the transport of such services. Thus, it becomes increasingly important for network operators to know the conditions under which their communications networks are operating, so that preventative maintenance or protection switching can be triggered when necessary. Ideally, such actions should be triggered when the BER of the channel exceeds a certain threshold for more than a certain amount of time and it is therefore of paramount importance to obtain a reliable measurement of the BER.

Unfortunately, conventional approaches do not take into consideration the fact that the BER can have an extremely wide dynamic range. That is to say, some conventional methods work well at low error rates and others at high error rates, but typical BER estimation methods do not provide an accurate estimate of the BER across a wide dynamic range.

At low error rates, it is crucial to ensure that each error is captured by the BER measurement system. To this end, most conventional approaches employ parity bits which are part of the overhead of transmitted frames. The receiver then reconstructs the parity operation for each received frame and compares the result to see if it is identical to the parity bits received in the overhead. If not, then an error is declared to have occurred.

In the case of a 40 Gbps signal and Poisson distributed errors having a rate of $10^{-16}$, the occurrence of two errors takes approximately one week. At such low error rates, errors are most likely to occur very far apart in time, which means that it is extremely rare to have more than one bit error in a group of bits from which a parity bit is computed. Thus, it is possible for the receiver to catch all errors because there is virtually zero probability that the parity bits are unreliable.

However, the just described approach has severe drawbacks at higher error rates. For instance, when the BER increases beyond about $4.6*10^{-4}$, it can be shown that so many of the bits of an 8000 Hz OC-768 frame are in error that the parity bits in the frame become meaningless. In other words, the parity bits become "saturated" and the receiver is unable to discriminate between a BER of $4.6*10^{-4}$ or any higher BER.

One remedy which prevents the onset of saturation until a BER of about $10^{-2}$ is simply the use of a larger number of parity bits. However, the parity bits might take up more space than is available in the entire overhead of a conventional SONET frame. Furthermore, the receiver must devote such an enormous amount of its resources to processing the parity bits that it will be incapable of performing other tasks such as processing the user information carried by the frame.

Thus, the industry is in need of a technique by virtue of which it would be possible to detect, to within a reasonable degree of accuracy, the BER of a communication channel, where the BER may potentially have an extremely wide dynamic range.

SUMMARY OF THE INVENTION

By virtue of a special parity check performed at the transmitter for each transmitted frame and by virtue of a special processing routine performed at the receiver on each received frame, it is possible to accurately estimate the BER across a wide dynamic range.

According to the invention, a measurement array is created at the transmitter from the bits in each frame, known as the frame bits. The measurement array is constructed from various combinations of frame bits, including at least one combination which includes many frame bits and at least one combination which includes only a few frame bits. The measurement array is then transmitted along with the frame bits, preferably in the overhead of the frame itself. Upon receipt of the frame, the receiver performs a parity check on the received frame bits and on the measurement array, thereby to create a symptomatic array.

The symptomatic array can be processed during the course of successive frames and the results of this processing could be combined and mapped to an estimate of the error rate.

The symptomatic array could also be accumulated during the course of successive frames, resulting in an accumulated symptomatic array. After a sufficiently high number of frames, it will become clear from the values of the elements in the accumulated symptomatic array which bits in the symptomatic array are saturated and which are not.

The accumulated symptomatic array could then be mapped to a BER estimate. This mapping could be based on the proximity of the elements of the accumulated symptomatic array to a set of values associated with a known BER or based on the result of a dot product between the accumulated symptomatic array and a weight vector.

Therefore, the invention may be summarized broadly as a method of estimating the error rate of a communication channel, which includes the steps of a) for each of a plurality of sub-sets of data elements in the frame, deriving a respective measurement value from the sub-set of data elements, wherein at least two of the sub-sets contain substantially different numbers of data elements;

b) transmitting the data elements and the measurement values across the communication channel;

c) receiving the data elements and the measurement values; and d) for each received measurement value, deriving a respective symptomatic value from the received measurement value and from the received data elements corresponding to the data elements in the sub-set from which the corresponding measurement value was generated prior to transmission thereof.

The above process is repeated for a number of subsequent frames and the arrays of symptomatic values associated with the various frames are processed to yield an estimate of the error rate.

Preferably, the number of sub-sets associated with each frame is logarithmically related to the number of data elements in the frame. Also preferably, the union of the sub-sets associated with each frame cover all the data elements in the frame.

The step of deriving a measurement value may include determining the parity of the data elements in the respective sub-set of data elements. Similarly, the step of deriving a symptomatic value may include determining the parity of the respective received measurement value together with the received data elements corresponding to the data elements in the respective sub-set from which the corresponding measurement value was generated prior to transmission thereof.

Each frame may include a payload and an overhead and the measurement values associated with a particular frame may be inserted into that frame's overhead. However, the measurement values could be transmitted separately from the data elements.

The step of generating an estimate may include generating a respective intermediate estimate from each symptomatic array and generating the estimate from the intermediate estimates. An intermediate estimate could be generated by comparing the respective symptomatic array to a set of pre-determined vectors associated with respective error rates and choosing as an intermediate error rate estimate the error rate associated with the pre-determined vector being closest to the summed symptomatic array.

Alternatively, the generation of an estimate may include processing the symptomatic arrays in an element-wise manner to produce a composite symptomatic array and generating the estimate from the composite symptomatic array. Suitable processing includes summing the symptomatic arrays in an element-wise manner.

To obtain the error estimate, the composite symptomatic array could be compared to a set of pre-determined vectors associated with respective error rates and the error rate estimate could be chosen as the error rate associated with the pre-determined vector being closest to the composite symptomatic array.

Alternatively, the estimate could be generated as a function of the elements of the composite symptomatic array.

Alternatively, the estimate could be obtained by generating a weight vector as a function of the composite symptomatic array and computing a function of the weight vector and of the composite symptomatic array.

The steps of the method could be performed by an encoder at the transmitter and a bit error rate estimation module at the receiver. The invention could be implemented in software, firmware, hardware or control logic.

It will be apparent that when each parity bit in the measurement array is generated from a progressively smaller set of frame bits, saturation of the bits in the symptomatic array will occur on a logarithmic scale rather than a linear scale. Thus, not all the bits in the symptomatic array will be saturated. As a result, information can be gathered from the elements of the accumulated symptomatic array which correspond to non-saturated bits in the symptomatic array and thus errors due to a wide range of BERs can be captured.

The advantages of the invention are numerous. For example, the bit error rate measurement is accurate over a wide dynamic range of bit error rates, which avoids triggering undue preventative maintenance, unnecessary re-routing and unnecessary protection switching. In addition, very few bits per frame are used for storing the measurement array associated therewith, which results in significant bandwidth savings.

Furthermore, the ability to accurately determine that the BER on a communications link is as high as $10^{-2}$ can prevent the link from being unnecessarily dropped, as the link can still be operable if forward error correction techniques are employed.

BRIEF DESCRIPTION OF THE DRAWINGS

These and other aspects and features of the present invention will now become apparent to those of ordinary skill in the art upon review of the accompanying description of specific embodiments of the invention in conjunction with the following drawings, in which.

DETAILED DESCRIPTION OF THE PREFERRED EMBODIMENTS

Figure 1:
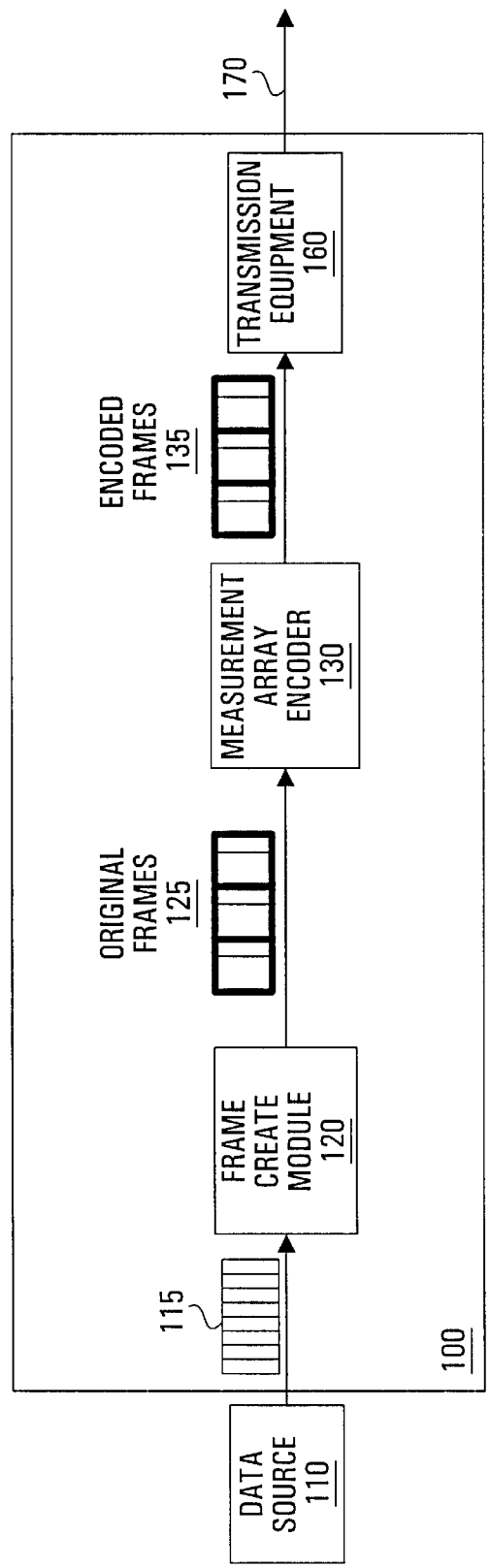
FIG. 1 is simplified block diagram illustration of a frame-based transmitter with a measurement array encoder according to the preferred embodiment of the present invention.

FIG. 1 shows a data transmitter 100, comprising a frame create module 120 and a measurement array encoder 130. The frame create module 120 accepts a digital binary data stream 115 from a data source 110, which could be a router, a switch, a digital telephone, a computer or other device. The frame create module 120 contains circuitry or software for organizing the bits in the received binary data stream 115 into frames 125.

Each of the frames 125 may consist of two portions, namely an "overhead" and a "payload". The payload contains bits from the binary data stream 115, while the overhead typically contains control information. The following assumes that the frames 125 have a single payload portion and a single overhead portion, although one skilled in the art will appreciate that frames having a more complex structure are within the scope of the invention.

The frames 125 produced by the frame create module 120 are fed to the measurement array encoder 130, which is equipped with circuitry or software for performing a special parity check on each received frame. The result of this special parity check forms a "measurement array", which is inserted by the measurement array encoder 130 into a portion of the frame's overhead. Thus, the measurement array encoder 130 produces a stream of "encoded" frames 135, each of which has a payload that is identical to the payload of the corresponding original frame, as well as an overhead that is almost identical to the overhead of the corresponding original frame, except that it has been modified so as to contain the measurement array.

The measurement array encoder 130 feeds the encoded frames 135 to suitable transmission equipment 160, which can be of standard design. The transmission equipment 160 forwards the encoded frames 135 across a communication medium 170 such as an optical fiber, a coaxial cable, a copper twisted pair or a wireless radio link. The transmission equipment 160 may also apply a suitable modulation scheme to the encoded frames 135.

Figure 2:
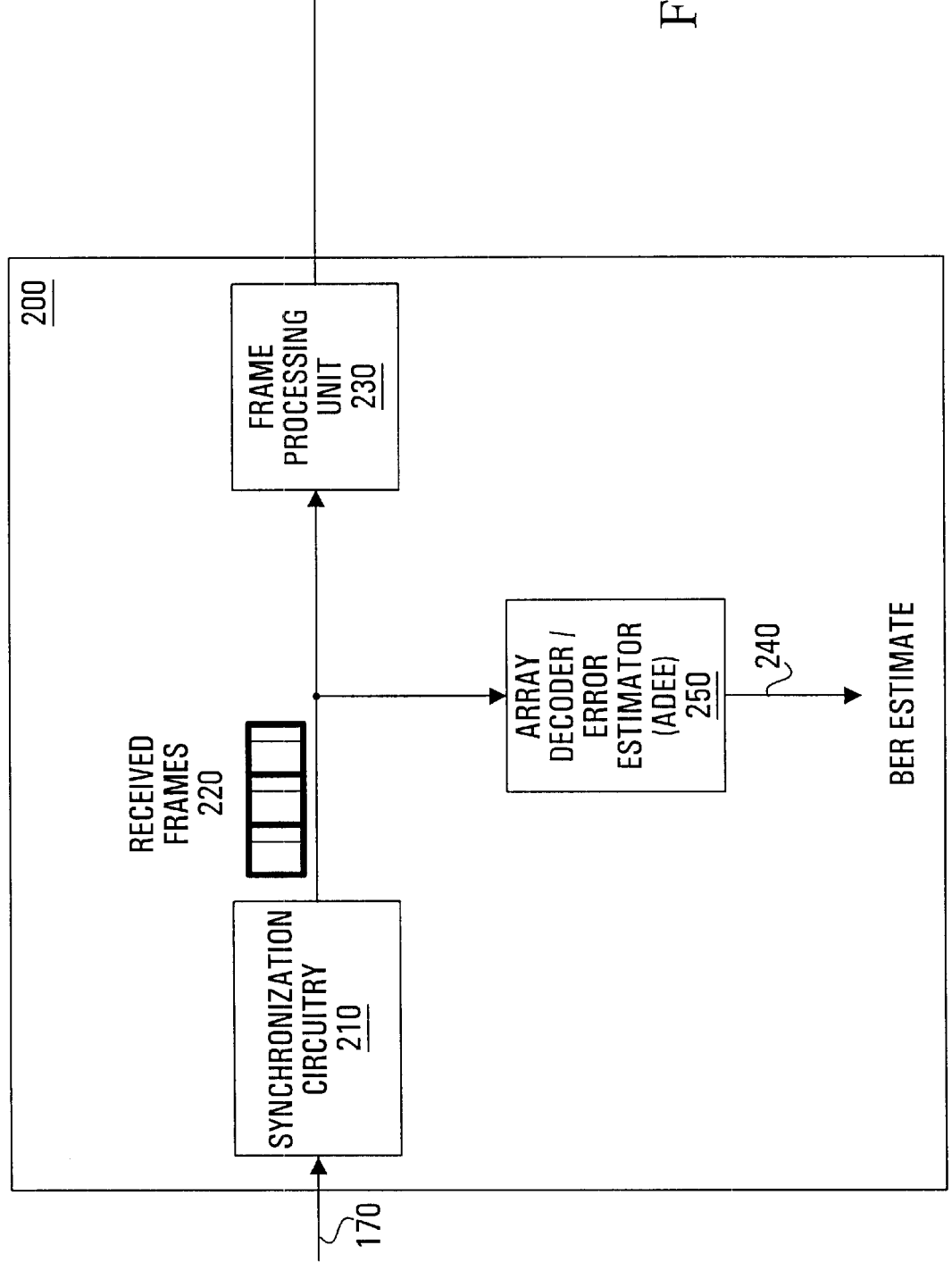
FIG. 2 is a simplified block diagram of a receiver system with an array decoder/error estimator (ADEE) according to the preferred embodiment of the present invention.

Reference is now made to FIG. 2, which shows the structure of a receiver 200 having access to the same communication medium 170 as the transmitter 100 of FIG. 1. The receiver 200 is equipped with BER measurement functionality in accordance with the preferred embodiment of the present invention. The receiver 200 includes synchronization circuitry 210 for detecting frame boundaries in the signal received across the communication medium 170. The synchronization circuitry may also perform any required demodulation of the signal arriving on the communication medium 170 in order to produce a sequence of received frames 220.

The received frames 220 are fed to a frame processing unit 230 and to an inventive array decoder/error estimator (ADEE) 250. Although the boundaries between received frames can usually be identified quite accurately by the synchronization circuitry 210, the latter cannot determine which bits, if any, are corrupted in each of the received frames 220. Thus, the received frames 220 that are fed to the frame processing unit 230 and to the AADE 250 structurally resemble the encoded frames 135 at the output of the measurement array encoder 130 but may differ in content because certain bits may be corrupted.

The frame processing unit 230 could be a standard software or hardware unit. If the receiver 200 is located in a regenerator in an optical network, the frame processing unit 230 could be responsible for forwarding the received frames 220 to other parts of the network. In other scenarios, the frame processing unit 230 could be responsible for extracting data from the payload of each frame 220 and for feeding the data to a switch or possibly even to customer premises equipment.

The ADEE 250 is where estimation of the bit error rate (BER) is performed. The ADEE 250 can be software, hardware, firmware or control logic which is adapted to estimate the BER as described in further detail herein below. The ADEE 250 outputs a BER estimate which can be fed to other parts of the receiver system 200 in any suitable way, e.g., via a control link 240 or in software. It should be appreciated that the ADEE 250 may be located in a computer or processing unit that is external to the rest of the receiver 200.

Based on the estimated value of the BER, actions might be taken by the receiver system 200. For example, in a SONET system, a high estimated value of the BER may trigger protection switching or a preventative maintenance activity. It is envisaged that in other applications, the estimated value of the BER may be used to control receiver sensitivity and/or transmitter power, to request frame re-transmissions or to drop traffic to another wavelength. In any event, it is important that the estimated value of the BER reflect the actual value of the BER to a reasonable degree of accuracy, such as 20%, despite the fact that the actual BER may have a wide dynamic range.

Figure 3:
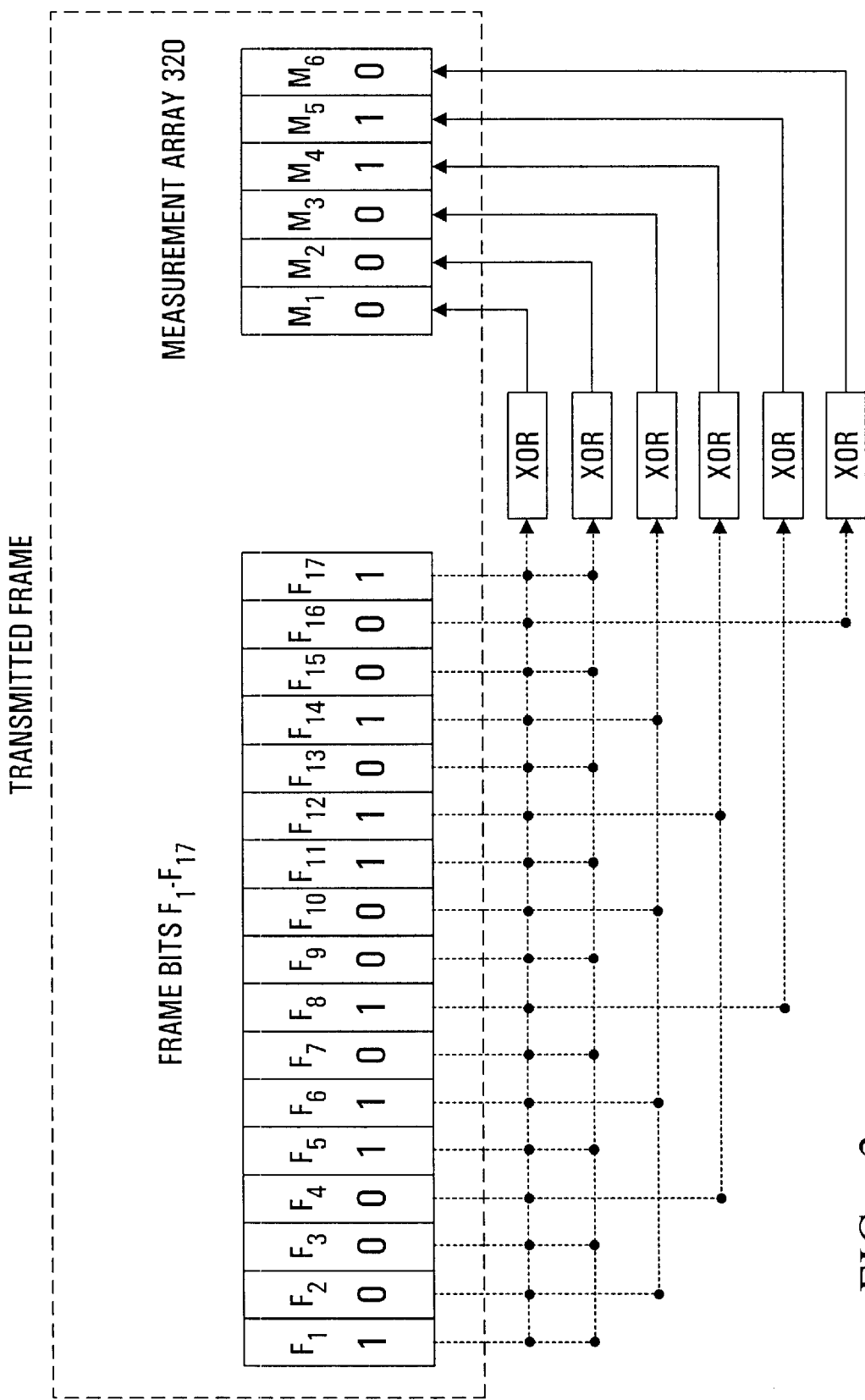
FIG. 3 illustrates creation of a measurement array from a plurality of frame bits by the measurement array encoder in FIG. 1.

Operation of the transmitter 100 and, in particular, construction of a "measurement array" by the measurement array encoder 130 of FIG. 1, is now described with further reference to FIG. 3. Specifically, there is shown one possible technique for constructing a measurement array given a plurality (in this case seventeen) of frame bits $F_1-F_{17}$. The frame bits may include just the payload bits or they may include the payload bits as well as the overhead bits.

As already mentioned, the measurement array encoder 130 of the present invention performs a special type of parity check on the frame bits $F_1-F_{17}$. This is not a standard parity check as performed according to the SONET standard, for example, where one parity bit is generated for each group of 783 frame bits. Rather, the present invention uses different size groups for generating each of a plurality of parity bits. Preferably, at least one of the parity bits will be a function of a relatively large percentage of the frame bits and at least one other parity bit will be a function of a relatively small percentage of the frame bits.

With specific reference to FIG. 3, therefore, there is shown a technique (which can be referred to as "radix-2 reduction") of generating six parity bits $M_1-M_6$ from the 17 frame bits $F_1-F_{17}$. The first parity bit $M_1$ is computed as a function of all the frame bits $F_1-F_{17}$. Since there is an even number of "1"'s among the frame bits, $M_1$ equals "0". Next, parity bit $M_2$ is found to be "0" as a result of XOR-ing frame bits $F_1, F_3, F_5, F_7, F_9, F_{11}, F_{13}, F_{15}$ and $F_{17}$. Similarly, parity bit $M_3$ is obtained by XOR-ing frame bits $F_2, F_6, F_{10}$ and $F_{14}$ and parity bit $M_4$ is obtained by XOR-ing frame bits $F_4$ and $F_{12}$. Parity bits $M_5$ and $M_6$ are simply equal to copies of frame bits $F_8$ and $F_{16}$, respectively.

In the preferred embodiment, each frame bit is covered by exactly two distinct parity computations, one of which results in the generation of the first frame bit $F_1$. It should be understood, however, that it is not essential to cover all the frame bits twice over. In fact, it is even permissible to leave one or more frame bits uncovered by any parity bit. However, for each bit that is left unaccounted for in this manner, there will be a reduction in the dynamic range of the BER which can be estimated at the receiver, particularly at low bit error rates.

It is also possible to use multi-valued functions for representing the parity result (in which case "parity" is a misnomer), which would require storing each such result using more than one bit. Nevertheless, it can be assumed without loss of generality that each parity result is indeed binary.

The parity bits $M_1-M_6$ computed in the above described way are then collected into a measurement array 320 that is transmitted along with the frame bits $F_1-F_{17}$ to the receiver 200. The measurement array 320 could be transmitted to the receiver 200 by simply inserting the measurement array 320 into part of the overhead of the frame which was not used for generating the parity bits $M_1-M_6$. Alternatively, if all of the bits in each frame (including the payload bits and the overhead bits) are used in the generation of parity bits $M_1-M_6$, then the measurement array 320 could be transmitted to the receiver 200 across a separate communications channel, as long as suitable synchronization is provided in order to enable the receiver 200 to match each received measurement array with the corresponding frame.

As the frame bits $F_1-F_{17}$ and the parity bits $M_1-M_6$ travel from the transmitter 100 to the receiver 200 across the communication medium 170, these bits will become corrupted. Now, it is clear that a single received parity bit becomes meaningless if it carries the parity of a group of bits among which two or more bits have been corrupted. This is because the receiver 200 has no way of distinguishing between odd and even numbers of errors, given a single parity bit. This effect is known as "saturation" of the parity bit in question.

In conventional parity schemes, saturation of a parity bit leads to an erroneous conclusion about the number of errors in the group of bits with which it is associated. Thus, the higher the BER, the more likely saturation is to occur.

However, saturation can be prevented by using fewer bits in computing the parity. Therefore, because the invention provides for some parity bits to be associated with a larger number of frame bits and others to be associated with a smaller number of frame bits, different parity bits will saturate above different respective BER thresholds. This allows the capture of rare errors, while at the same time preventing saturation of all parity bits at high error rates.

Thus, it will be appreciated that saturation of the parity bits happens on a logarithmic scale rather than on a linear scale, enabling an expansion of the dynamic range of possible BERs which can be measured at the receiver.

Operation of the receiver 200 is now described. Firstly, the synchronization circuitry 210 provides the ADEE 250 with frames whose boundaries have been accurately identified. It is then the task of the ADEE 250 to estimate the BER of the communication medium 170. To this end, the ADEE 250 does not estimate the degree to which each individual received frame is corrupted. Rather, the ADEE 250 executes the following three steps:

(1) for each received frame, the ADEE 250 creates a so-called "symptomatic array" in a manner to be described herein below;

(2) a so-called "error array" is created from the symptomatic arrays respectively associated with multiple frames;

(3) After a total of $N_F$ frames, the error array (at this point called a "cumulative error array") is mapped to an estimate of the BER.

Figure 4:
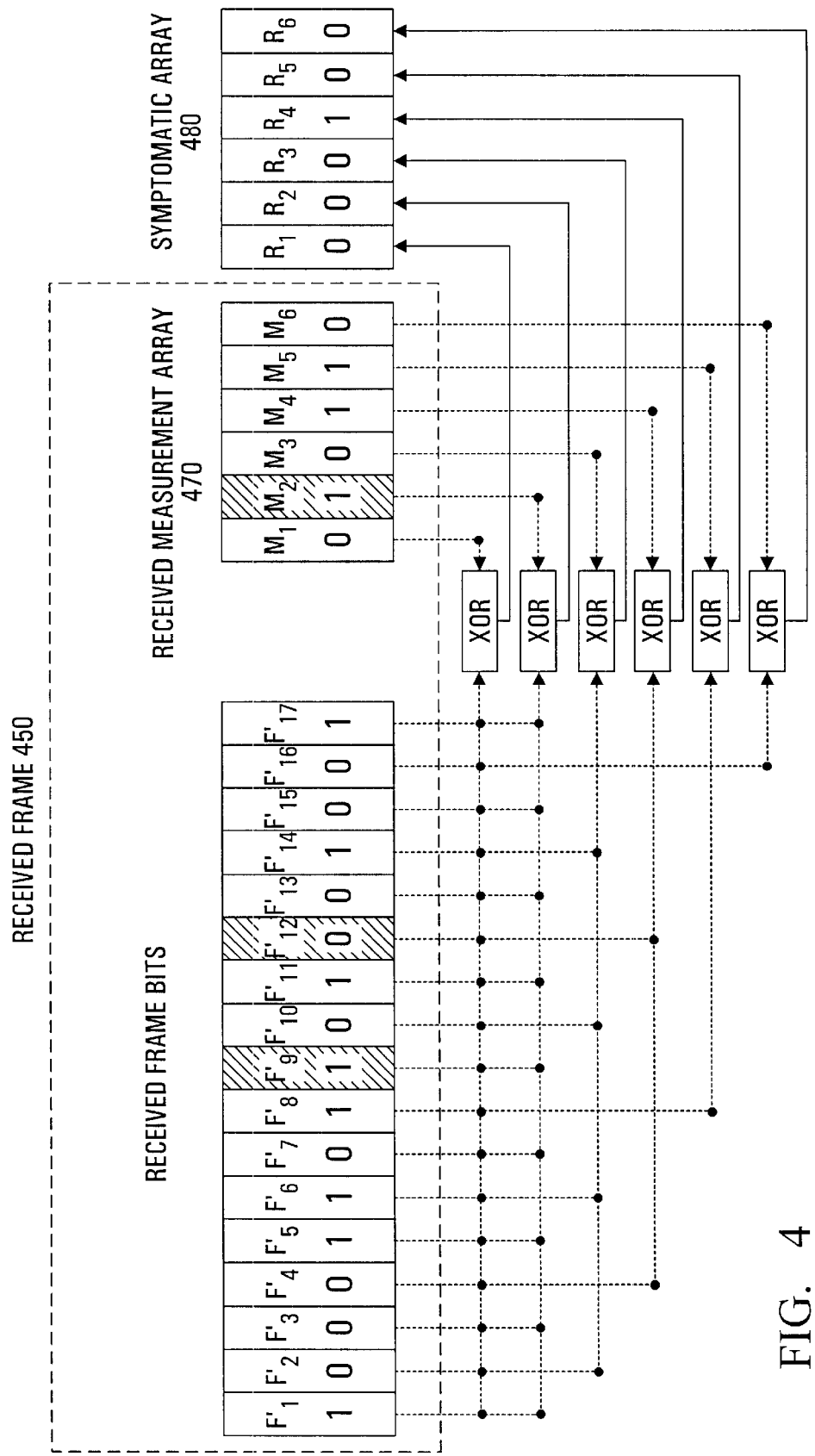
FIG. 4 illustrates creation of a symptomatic array from a plurality of received frame bits and a plurality of received parity bits by the ADEE in FIG. 1.

Each of these steps is now described. Firstly, reference is made to FIG. 4, which shows the manner in which a so-called "symptomatic array" 480 can be created from a received frame 450 containing a set of possibly corrupted received frame bits $F'_1-F'_{17}$ and a measurement array 470 containing a set of possibly corrupted received parity bits $M'_1-M'_6$.

The symptomatic array 480 contains bits $R_1-R_6$ and is the same size as the received measurement array 470. The symptomatic array 480 is created by performing a parity check on the received frame bits $F'_1-F'_{17}$ and on the received parity bits $M'_1-M'_6$. Specifically, bit $R_x$ in the symptomatic array 480 is the result of a parity check performed on received parity bit $M'_x$, as well as all those received frame bits associated with received parity bit $M'_x$.

For example, if parity bit $M'_3$ in the received measurement array 470 is associated with frame bits in positions 2, 6, 10 and 14, then bit $R_3$ in the symptomatic array 480 will be the result of a parity check performed on received frame bits $F'_2$, $F'_6$, $F'_{10}$, $F'_{14}$ and received parity bit $M'_3$.

In the case where the signal-to-noise ratio (SNR) of the communication medium 170 is high, there will be very few errors in the received frame 450. Thus, a parity check performed on the received frame bits and the received measurement array will yield a symptomatic array 480 that will be all zeroes.

However, the SNR is usually not sufficiently high for this situation to occur. Rather, the received frame 450 will be affected by errors. This generally results in the symptomatic array 480 containing one or more zero entries. For example, errors in received frame bits $F_9$, $F_{12}$ and received parity bit $M_2$ yield a symptomatic array 480 having the value 000100 shown in FIG. 4.

Every possible combination of errors among the received frame bits and received parity bits yields a corresponding combination of bits in the symptomatic array 480. However, multiple combinations of errors may lead to the same symptomatic array being generated. Thus, it is generally impossible to determine, from a single instance of the symptomatic array, how many erroneous bits are contained in the corresponding frame.

Instead, the symptomatic array is most useful when it is accumulated over time, which will eventually point to some bits being saturated and others not being saturated.

To this end, the symptomatic array 470 can be accumulated by the ADEE 250 in a so-called "error array" for a desired number of frames $N_F$. The value of $N_F$ can be made as large as necessary in order to achieve the desired level of precision in determining to what degree each of the bits in the symptomatic array are saturated. After the desired number $N_F$ of frames, the error array (at this stage referred to as a "cumulative" error array) is then mapped to a precise estimate of the BER. The value of $N_F$ trades off a desired amount of averaging against the delay associated with the accumulation of $N_F$ frames before providing a BER estimate.

Figure 5:
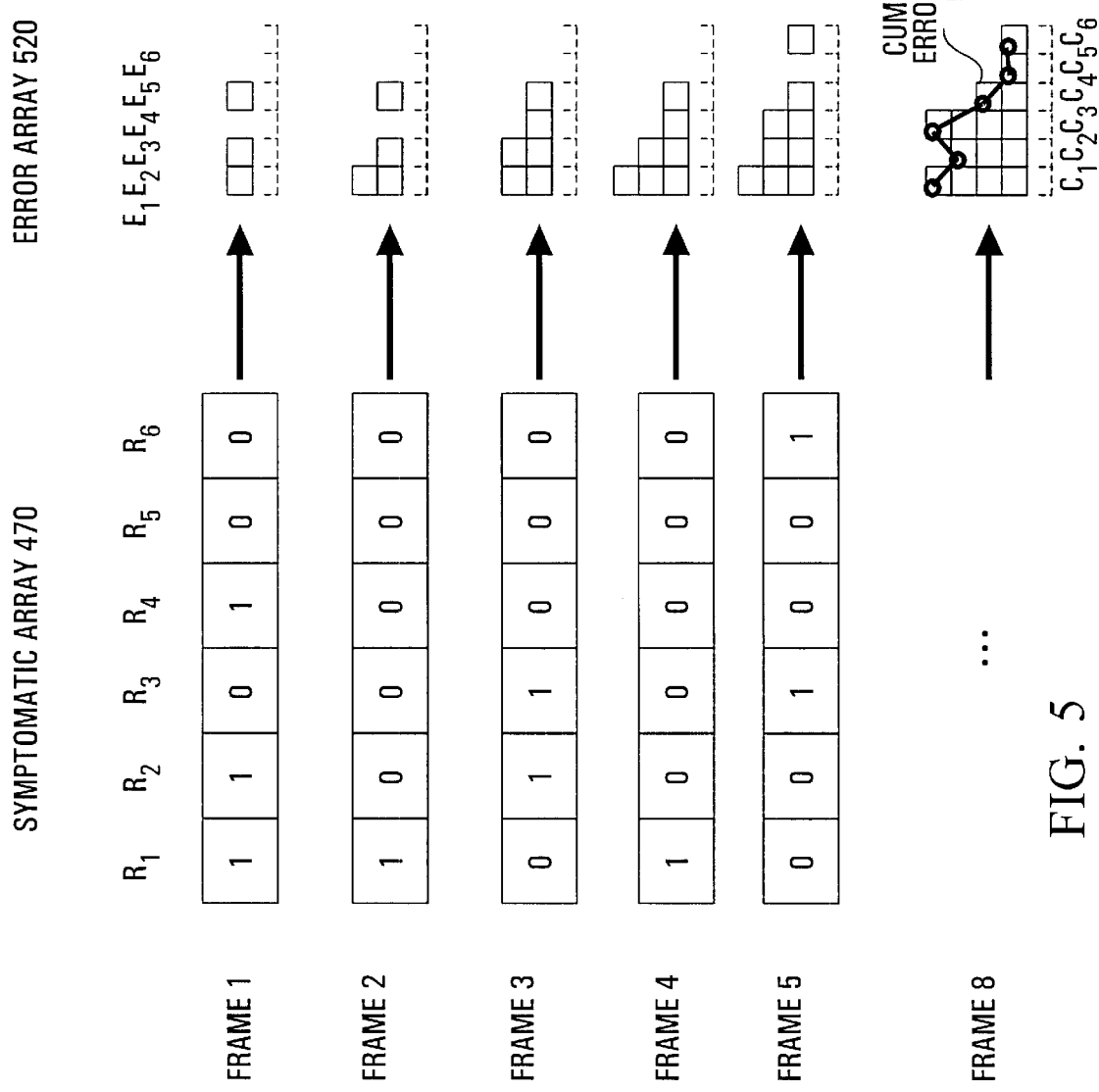
FIG. 5 shows computation of an error array as a result of successive computations of a symptomatic array by the ADEE in FIG. 1.

FIG. 5 shows an example progression of an error array 520 resulting from the accumulation of a symptomatic array 470 over 8 frames. The error array 520 has six elements $E_1-E_6$ and thus has the same length as the symptomatic array 510. However, the elements of the error array 520 must be capable of taking on non-binary values. To emphasize this point, the error array 520 is illustrated in FIG. 5 as being two dimensional, with each element of the error array 520 being represented by a stack having a height proportional to the value of the respective element.

The progression of the error array 520 is now tracked, starting with the receipt of FRAME__1, following which the symptomatic array 470 may have been found to have the value 1-1-0-1-0-0, which is inserted directly into the error array 520 (presumed to be initialized to zero). Following receipt of FRAME__2, the symptomatic array 470 might be equal to 1-0-0-0-0-0, which value is added to the previous value of the error array 520 in an element-by-element fashion.

Next, FRAME__3 is received and the resulting symptomatic array 510 may be equal to 0-1-1-0-0-0, which value is then added, element-wise, to the previous value of the error array 520. Upon receipt of FRAME__4, the symptomatic array 470 may be found to have the value 1-0-0-0-0-0, which is also added to the previous value of the error array 520 on an element-by-element basis.

Following receipt of FRAME__5, the symptomatic array 470 may have the value 0-0-1-0-0-1, which continues to be added to the previous value of the error array 520. The process continues until each bit in the symptomatic array 470 associated with FRAME__8 is added to the running total of the corresponding element in the error array 520. This yields a cumulative error array 530 with elements $C_1$, $C_2$, $C_3$, $C_4$, $C_5$, $C_6$, having the values 4,3,4,2,1,1, respectively.

Since elements $C_1$, $C_2$ and $C_3$ of the cumulative error array 530 have values that are equal (or close) to $N_F/2$, the bits used to construct bits $R_1$, $R_2$ and $R_3$ of the symptomatic array 470 have even parity half the time and odd parity the other half of the time. This is a clear indication that bits $R_1$, $R_2$ and $R_3$ in the symptomatic array 470 are saturated. This, in turn, means that the BER affecting the frame bits used to generate parity bits $M_1$, $M_2$ and $M_3$ is higher than what can be discriminated by the ADEE 250 based on these three bits alone.

However, as long as not all of the elements in the cumulative error array 530 have values in the neighbourhood of $N_F/2$, the cumulative error array 530 can be used to estimate the BER to a reasonable degree of accuracy. Two techniques for mapping the cumulative error array 530 to a BER estimate are an interpolation method and a weighting method.

INTERPOLATION METHOD

The interpolation method relies on the fact that for large enough $N_F$ and for each possible (constant) value of the BER on the communication medium 170, the error array 520 will, by virtue of being continuously refined, converge to a unique "theoretical" cumulative error array. The theoretical cumulative error array, denoted $\{T_{BER}\}$ is thus a function of the BER. The values of its elements can be found analytically or experimentally. The theoretical cumulative error array could be stored in the receiver or in an external computational module as a series of numerical values or, equivalently, as an algorithm for its calculation based on the value of the bit error rate.

Therefore, $\{T_{BER}\}$ corresponding to a wide range of BER can be pre-computed and stored at the ADEE 250, then the actual BER of the communication channel 170 can be determined by comparing the measured cumulative error array 530 to each $\{T_{BER}\}$ until a close enough match is found.

In an alternative embodiment of the interpolation method, it is possible to estimate the BER of the communication channel 170 even if theoretical cumulative error array is known for only one bit error rate, say BER(1), in which case the theoretical cumulative error array could be denoted $\{TBER_{(1)}\}$.

Figure 6:
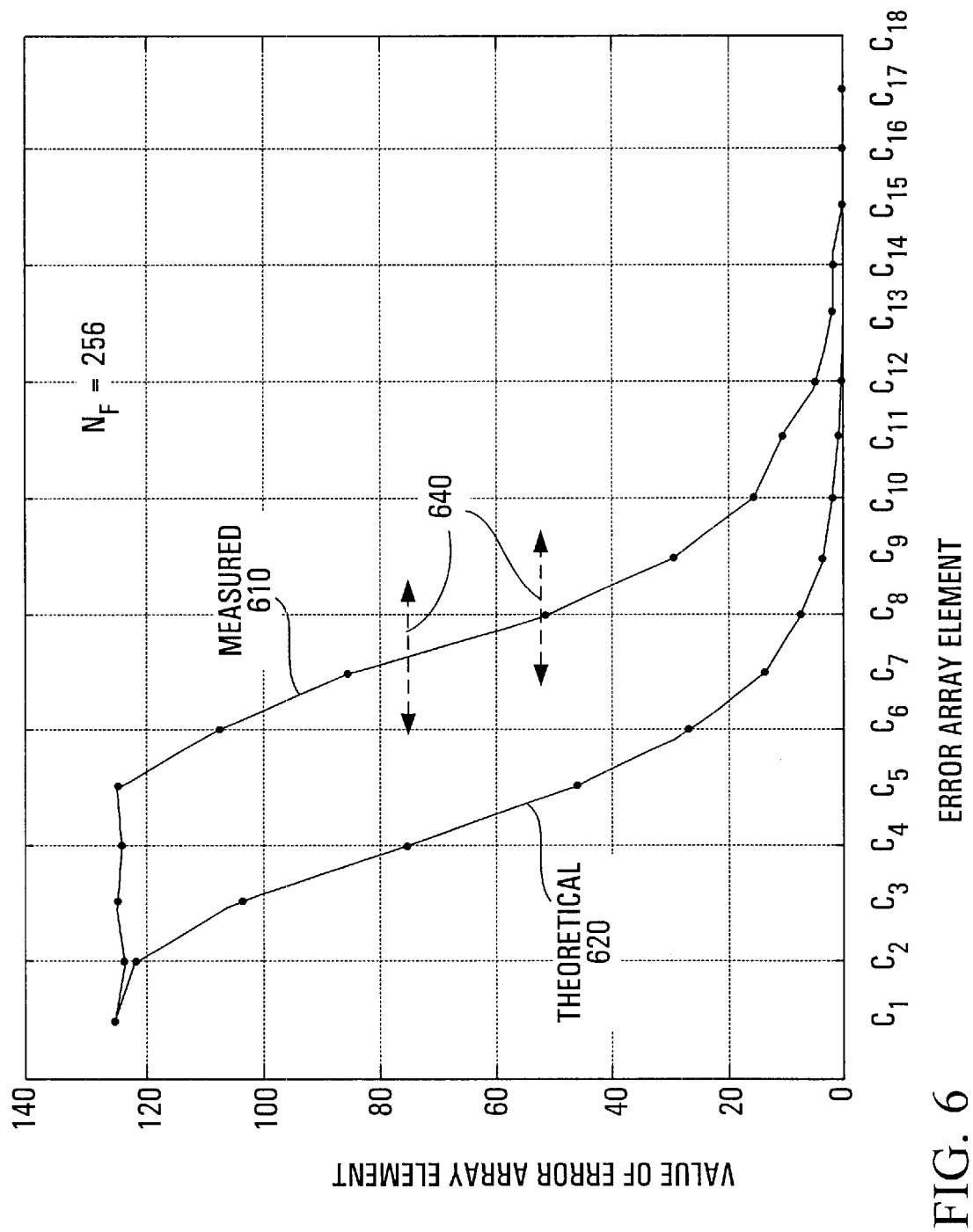
FIG. 6 shows a measured error curve in relation to a theoretical error curve corresponding to a known BER.

This will best be understood by referring to FIG. 6, where the value of a particular measured cumulative error array has been plotted for each element in the array, resulting in a so-called "measured error curve" 610. (The value of $N_F$ is equal to 256 and the length of the cumulative error array is 16 in this particular case.) From FIG. 6, it is seen that elements $C_1$–$C_5$ of the cumulative error array are saturated because they have a value at or near $N_F/2=128$.

FIG. 6 also shows a "theoretical error curve" 620, which has been formed by plotting the results of a single theoretical cumulative error vector $\{T_{BER(1)}\}$ for each element in the vector. It will be appreciated by those skilled in the art that other theoretical error curves corresponding to a respective BER that is equal to ($\alpha$*BER(1)) will be of the same shape, but will be displaced by ($\log_2(\alpha)$*BER(1)) bits to the right. In this case, the term "bits" may not be strictly accurate when referring to the horizontal displacement because log2 ($\alpha$) is oftentimes fractional, but the apparent problem can be overcome if the curves are interpolated.

As a result of this relationship between theoretical error curves, therefore, it is possible to determine the BER corresponding to the measured error curve 610 by determining the distance (in fractional bits) by which the measured error curve 610 has to be shifted horizontally (along axis 640) in order to be as close as possible to the theoretical error curve 620. The two curves (theoretical and shifted measured) can be deemed to be as close as possible when the means square of the difference between the two curves is minimized. Of course, shifting could be applied to the theoretical error curve 620 rather than to the measured error curve 610.

Moreover, other criteria or functions could be used for evaluating the proximity of the two curves. For example, it is possible to obtain the distance separating the bits by finding the transform (e.g., the Fourier transform) of both the measured error curve and the theoretical error curve and then to find the phase difference between the two transforms. The phase difference is related to the delay (in fractions of a bit) between the two initial curves. Another one of the numerous ways of finding the distance between the theoretical and measured error curves is to find the location of the peak in a correlation function evaluated with or without transforms.

WEIGHTING METHOD

A second approach to deriving an estimate of the true value of the BER based on the value of the cumulative error array 530 by evaluating the dot product of the cumulative error array 530 with a weighting vector. According to this embodiment of the invention, the weighting vector assigns a relative importance to each element in the cumulative error array 530.

Using a parametric optimization technique, for example, it is possible to select a set of weights for a given size of cumulative error array and a given value of $N_F$ so that the inner product of the weight vector and the cumulative error array is as close as possible to being directly proportional to the number of bit errors having occurred in those $N_F$ frames, for any BER within a desired range.

According to the one embodiment, the weights can be selected by (i) finding the ratio of the inner product to the number of errors for various known values of the BER and (ii) adjusting the weights so that the set of ratios has minimum variance.

Another method of determining the weights is more heuristic and exploits on the logarithmic scale on which saturation occurs. Specifically, apart from the first weight (which may be given a constant value such as ½), the weights are assigned logarithmically increasing values from left to right until a zero is hit in the corresponding element of the cumulative error array. The remaining elements of the weight vector are then set to the same value as the last element of the weight vector before the zero was found in the corresponding element of the cumulative error array.

For example, where $N_F=8$ and the size of the cumulative error array 530 is 12, the above approach yields the following weighting vector:

| Cumulative | 4 | 5 | 4 | 3 | 4 | 2 | 2 | 1 | 0 | 1 | 0 | 1 |
|---|---|---|---|---|---|---|---|---|---|---|---|---|
| Weight | ½ | ½ | 1 | 2 | 4 | 8 | 16 | 32 | 32 | 32 | 32 | 32 |

The dot product of the cumulative error array and of the weight vector is then formed. That is to say, the elements of the cumulative error array are multiplied on an element-by-element basis with the elements of the weighting vector and the products are then added to obtain a final result. The final result is an estimate of the number of errors in the last $N_F$ frames, which can be normalized by the number of bits in 8 frames to obtain an estimate of the BER.

In some cases, computation of the BER using the above-described weighting method may not yield the desired accuracy, due to the empirical nature of the approach used to assign values to the individual elements of the weight vector. It has been shown, however, that when the weighting algorithm is used to construct a weight vector, the bit error rate obtained using the above described technique deviates from the actual bit error rate according to a deterministic function.

Figure 7:
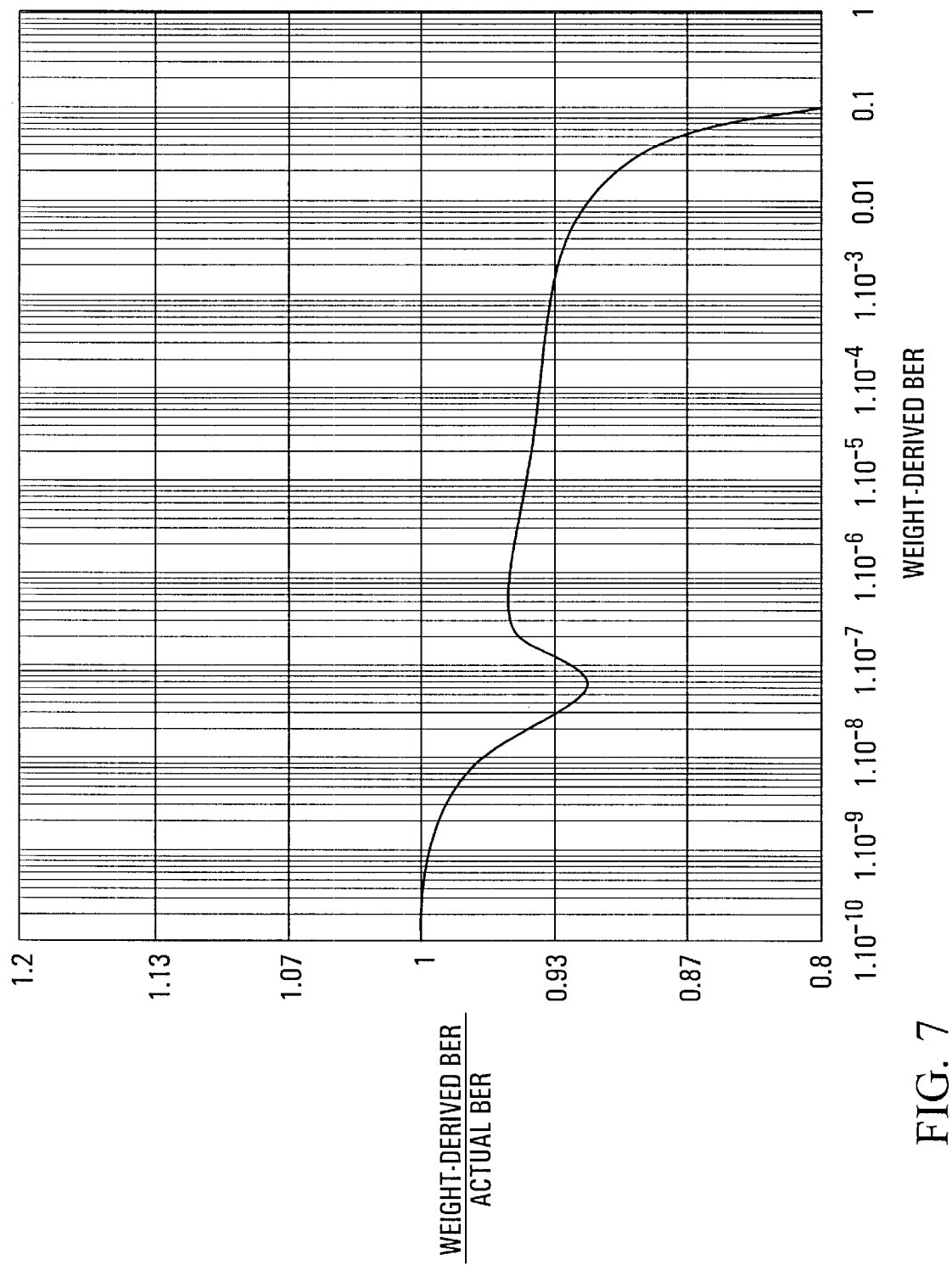
FIG. 7 shows a compensation curve which can be used to improve the accuracy of a BER estimate.

For example, FIG. 7 shows an example of a compensation curve that maps the ratio of the BER derived from the weighting method to the actual BER, as a function of the derived BER. The actual BER can be to obtained with the aid of FIG. 7 simply by dividing the derived BER by the value of the ordinate corresponding to the derived BER on the abscissa. The existence of the function shown in FIG. 7 is remarkable because it allows the actual BER (or a very close estimate thereof) to be obtained simply by compensating the derived BER by a known value.

Of course, other compensation curves will apply for different values of $N_F$ and different instances of the weighting vector. Also, a look-up table could be used for compensation purposes in order to obtain a closer estimate of the actual BER from the derived BER.

Of course, other empirical, experimental or analytical techniques for selecting suitable values of the elements of the weight vector can be used. Furthermore, it is within the scope of the invention to use functions of the cumulative error array and the weight vector that are different from the familiar dot (inner) product. For example, using numerical techniques, it is possible to generate an optimized assignment of weights and a special multi-variate function of the weight vector and the cumulative error array which flattens the curve of FIG. 9, eliminating the need for compensation of the derived BER.

The estimated BER is fed to other parts of the receiver system, where decisions concerning preventative maintenance and traffic re-routing may be made as a function of the estimated BER. Clearly, as the invention achieves accurate estimation of the BER over a wide dynamic range, better system-level decisions can be made, which will result in less wastage of resources and quicker responses to actual degradations in BER. Moreover, the invention requires that only a very small percentage of the overhead bandwidth be taken up for transmitting the relevant parity information, which results in significant savings in terms of cost and processing time within the receiver system.

In the preferred embodiment, the error array was created through the element-by-element accumulation of the symptomatic array derived from each received frame. It will be understood, however, that the accumulation of the error array per se is not crucial. In fact, it is within the scope of the invention to produce intermediate estimates of the bit error rate from each individual symptomatic array as it becomes available and to evaluate a function of the resultant intermediate estimates in order to obtain a final estimate.

That is to say, while it is important that information is derived from the symptomatic arrays associated with multiple frames, it is not important that the symptomatic arrays be accumulated before deriving the estimate of the bit error rate. Thus, equivalent results may be achieved by exploiting commutative and associative properties of the mathematical steps involved in deriving an error estimate from multiple instances of the symptomatic array.

Moreover, the various instances of the error array, the symptomatic array, the cumulative error array and the theoretical error curve as described in the foregoing are entities which need not all be stored in the same memory element or in contiguous memory locations.

While the preferred embodiment of the present invention has been described and illustrated, it will be apparent to those skilled in the art that numerous modifications and variations can be made without departing from the scope of the invention as defined in the appended claims.

We claim:
1. A method of estimating the error rate of a communication channel, comprising:
(A) for each of a plurality of frames:
for each of a plurality of sub-sets of data elements in the frame, deriving a respective measurement value from said sub-set of data elements, wherein at least two of said sub-sets contain substantially different numbers of data elements;
transmitting the data elements and the measurement values across the communication channel;
receiving the data elements and the measurement values; and
for each received measurement value, deriving a respective symptomatic value from said received measurement value and from the received data elements corresponding to the data elements in the sub-set from which the corresponding measurement value was generated prior to transmission thereof, thereby to create a symptomatic array respectively associated with the frame; and
(B) generating an estimate of the error rate from the symptomatic arrays respectively associated with said plurality of frames.

2. A method as claimed in claim 1, wherein the number of sub-sets associated with each frame is logarithmically related to the number of data elements in the frame.

3. A method as claimed in claim 1, wherein the union of the sub-sets associated with each frame cover all the data elements in the frame.

4. A method as claimed in claim 2, wherein the union of the sub-sets associated with each frame cover all the data elements in the frame.

5. A method as claimed in claim 1, wherein the step of deriving a measurement value comprises determining the parity of the data elements in the respective sub-set of data elements.

6. A method as claimed in claim 2, wherein the step of deriving a measurement value comprises determining the parity of the data elements in the respective sub-set of data elements.

7. A method as claimed in claim 1, wherein the step of deriving a symptomatic value comprises determining the parity of the respective received measurement value together with the received data elements corresponding to the data elements in the respective sub-set from which the corresponding measurement value was generated prior to transmission thereof.

8. A method as claimed in claim 5, wherein the step of deriving a symptomatic value comprises determining the parity of the respective received measurement value together with the received data elements corresponding to the data elements in the respective sub-set from which the corresponding measurement value was generated prior to transmission thereof.

9. A method as claimed in claim 6, wherein the step of deriving a symptomatic value comprises determining the parity of the respective received measurement value together with the received data elements corresponding to the data elements in the respective sub-set from which the corresponding measurement value was generated prior to transmission thereof.

10. A method as claimed in claim 1, wherein each frame comprises a payload and an overhead and wherein the measurement values associated with a particular frame are inserted into that frame's overhead.

11. A method as claimed in claim 1, wherein the measurement values are transmitted separately from the data elements.

12. A method as claimed in claim 1, wherein the step of generating an estimate comprises:

generating a respective intermediate estimate from each symptomatic array; and generating the estimate from the intermediate estimates.

13. A method as claimed in claim 12, wherein the step of generating an intermediate estimate comprises:

comparing the respective symptomatic array to a set of pre-determined vectors associated with respective error rates; and choosing as an intermediate error rate estimate the error rate associated with the pre-determined vector being closest to the summed symptomatic array.

14. A method as claimed in claim 1, wherein the step of generating an estimate comprises:

processing the symptomatic arrays in an element-wise manner to produce a composite symptomatic array; and generating the estimate from the composite symptomatic array.

15. A method as claimed in claim 14, wherein the step of processing comprises summing the symptomatic arrays in an element-wise manner.

16. A method as claimed in claim 14, wherein generating the estimate comprises computing a function of the composite symptomatic array and a pre-determined vector associated with a known error rate.

17. A method as claimed in claim 16, wherein the step of computing a function comprises:

shifting the composite symptomatic array until it is substantially close to the pre-determined vector; and setting the error rate estimate equal to the known error rate multiplied by an exponential function of the number of positions by which the composite symptomatic array was shifted.

18. A method as claimed in claim 17, wherein said number of positions is fractional.

19. A method as claimed in claim 16, wherein the step of computing a function comprises:

shifting the pre-determined vector until it is substantially close to the composite symptomatic array; and setting the error rate estimate equal to the known error rate multiplied by an exponential function of the number of positions by which the pre-determined vector was shifted.

20. A method as claimed in claim 19, wherein said number of positions is fractional.

21. A method as claimed in claim 14, wherein generating the estimate comprises:

comparing the composite symptomatic array to a set of pre-determined vectors associated with respective error rates; and choosing as the error rate estimate the error rate associated with the pre-determined vector being closest to the composite symptomatic array.

22. A method as claimed in claim 14, wherein the step of generating the estimate comprises computing a function of the elements of the composite symptomatic array.

23. A method as claimed in claim 22, wherein said function is linear.

24. A method as claimed in claim 22, wherein said function is non-linear.

25. A method as claimed in claim 14, wherein the step of generating the estimate comprises:

generating a weight vector as a function of the composite symptomatic array; and computing a function of the weight vector and of the composite symptomatic array.

26. A method as claimed in claim 25, wherein the step of generating the estimate further comprises dividing said function of the weight vector and of the composite symptomatic array by the number of bits in the total number of frames used to produce the composite symptomatic array.

27. A method as claimed in claim 25, wherein said function of the weight vector and of the composite symptomatic array is the dot product.

28. A method as claimed in claim 26, wherein said function of the weight vector and of the composite symptomatic array is the dot product.

29. A method as claimed in claim 9, wherein the step of generating an estimate comprises:

processing the symptomatic arrays in an element-wise manner to produce a composite symptomatic array; and generating the estimate from the composite symptomatic array.

30. A method as claimed in claim 29, wherein generating the estimate comprises computing a function of the composite symptomatic array and a pre-determined vector associated with a known error rate.

31. A method as claimed in claim 29, wherein the step of generating the estimate comprises:

generating a weight vector as a function of the composite symptomatic array; and computing a function of the weight vector and of the composite symptomatic array.

32. A method of estimating the error rate of a communication channel from a plurality of frames and a respective plurality of sets of measurement values, wherein each measurement value is a function of a respective sub-set of data elements in the corresponding frame, wherein at least two of the sub-sets of data elements in the each frame contain substantially different numbers of data elements, the method comprising:

for each received frame, generating a respective symptomatic array comprising a plurality of symptomatic values, wherein each symptomatic value is derived from a respective received measurement value and from the received data elements corresponding to the data elements in the respective sub-set from which the corresponding measurement value was generated prior to transmission thereof; and generating an estimate of the error rate from the symptomatic arrays respectively associated with said plurality of received frames.

33. A method as claimed in claim 32, wherein the step of generating an estimate comprises:

generating a respective intermediate estimate from each symptomatic array; and generating the estimate from the intermediate estimates.

34. A method as claimed in claim 33, wherein the step of generating an intermediate estimate comprises:

comparing the respective symptomatic array to a set of pre-determined vectors associated with respective error rates; and choosing as an intermediate error rate estimate the error rate associated with the pre-determined vector being closest to the summed symptomatic array.

35. A method as claimed in claim 32, wherein the step of generating an estimate comprises:

processing the symptomatic arrays in an element-wise manner to produce a composite symptomatic array; and generating the estimate from the composite symptomatic array.

36. A method as claimed in claim 35, wherein the step of processing comprises summing the symptomatic arrays in an element-wise manner.

37. A method as claimed in claim 35, wherein generating the estimate comprises computing a function of the composite symptomatic array and a pre-determined vector associated with a known error rate.

38. A method as claimed in claim 37, wherein the step of computing a function comprises:
    shifting the composite symptomatic array until it is substantially close to the pre-determined vector; and
    setting the error rate estimate equal to the known error rate multiplied by an exponential function of the number of positions by which the composite symptomatic array was shifted.

39. A method as claimed in claim 38, wherein said number of positions is fractional.

40. A method as claimed in claim 37, wherein the step of computing a function comprises:
    shifting the pre-determined vector until it is substantially close to the composite symptomatic array; and
    setting the error rate estimate equal to the known error rate multiplied by an exponential function of the number of positions by which the pre-determined vector was shifted.

41. A method as claimed in claim 40, wherein said number of positions is fractional.

42. A method as claimed in claim 35, wherein generating the estimate comprises:
    comparing the composite symptomatic array to a set of pre-determined vectors associated with respective error rates; and
    choosing as the error rate estimate the error rate associated with the pre-determined vector being closest to the composite symptomatic array.

43. A method as claimed in claim 35, wherein the step of generating the estimate comprises computing a function of the elements of the composite symptomatic array.

44. A method as claimed in claim 43, wherein said function is linear.

45. A method as claimed in claim 43, wherein said function is non-linear.

46. A method as claimed in claim 35, wherein the step of generating the estimate comprises:
    generating a weight vector as a function of the composite symptomatic array; and
    computing a function of the weight vector and of the composite symptomatic array.

47. A method as claimed in claim 46, wherein the step of generating the estimate further comprises dividing said function of the weight vector and of the composite symptomatic array by the number of bits in the total number of frames used to produce the composite symptomatic array.

48. A method as claimed in claim 46, wherein said function of the weight vector and of the composite symptomatic array is the dot product.

49. A method as claimed in claim 47, wherein said function of the weight vector and of the composite symptomatic array is the dot product.

50. An article of manufacture, comprising:
    a computer usable medium having computer readable program code means embodied therein for causing the error rate of a communication channel to be estimated from a plurality of frames and a respective plurality of sets of measurement values, wherein each measurement value is a function of a respective sub-set of data elements in the corresponding frame, wherein at least two of the sub-sets of data elements in the each frame contain substantially different numbers of data elements, the computer readable program code means in said article of manufacture comprising:
    computer readable program code means for causing a computer to generate, for each received frame, a respective symptomatic array comprising a plurality of symptomatic values, wherein each symptomatic value is derived from a respective received measurement value and from the received data elements corresponding to the data elements in the respective sub-set from which the corresponding measurement value was generated prior to transmission thereof; and
    computer readable program code means for causing the computer to generate an estimate of the error rate from the symptomatic arrays respectively associated with said plurality of received frames.

51. A bit error rate estimation module for estimating the bit error rate of a communication channel from a plurality of frames and a respective plurality of sets of measurement values, wherein each measurement value is a function of a respective sub-set of data elements in the corresponding frame, wherein at least two of the sub-sets of data elements in the each frame contain substantially different numbers of data elements, the bit error rate estimation module comprising:
    means for generating, for each received frame, a respective symptomatic array comprising a plurality of symptomatic values, wherein each symptomatic value is derived from a respective received measurement value and from the received data elements corresponding to the data elements in the respective sub-set from which the corresponding measurement value was generated prior to transmission thereof;
    means for generating an estimate of the error rate from the symptomatic arrays respectively associate with said plurality of received frames
    a data receiver, comprising synchronization circuitry for identifying frame boundaries in a signal received along a communication medium, thereby to generate a plurality of received frames; and a bit error rate estimation module as claimed in claim 50 and connected to the synchronization circuitry, for estimating the bit error rate of the communication channel.

52. A data receiver, comprising:
    synchronization circuitry, for identifying frame boundaries in a signal received along a communication medium, thereby to generate a plurality of received frames;
    a bit error rate estimation module as claimed in claim 50, connected to the synchronization circuitry.

53. A data communications system, comprising:
    a transmitter, comprising an encoder for generating a stream of encoded frames and transmission equipment connected to the output of the encoder, for sending the encoded frames along a communication channel, said encoder comprising:
        means for receiving a sequence of frames, each frame containing a payload portion having plurality of data elements and each frame also containing an overhead portion;
        means for generating, for each frame, a measurement array from the data elements in the payload portion of said frame, wherein at least two of values in the measurement array are functions of substantially different numbers of data elements; and means for inserting the measurement array generated from the data elements in the payload portion of each frame into the overhead portion of said frame; and a data receiver, comprising synchronization circuitry for identifying frame boundaries in a signal received along a communication medium, thereby to generate a plurality of received frames; and a bit error rate estimation module as claimed in claim 50 and connected to the synchronization circuitry, for estimating the bit error rate of the communication channel.

54. A bit error rate estimation module as claimed in claim 51, wherein the means for generating an estimate of the error rate comprises:

means for generating a respective intermediate estimate from each symptomatic array; and means for generating the estimate of the error rate from the intermediate estimates.

55. A bit error rate estimation module as claimed in claim 54, wherein the means for generating a respective intermediate estimate is operative to:

compare the respective symptomatic array to a set of pre-determined vectors associated with respective error rates; and choose as an intermediate error rate estimate the error rate associated with the pre-determined vector being closest to the summed symptomatic array.

56. A bit error rate estimation module as claimed in claim 51, wherein the means for generating an estimate of the error rate comprises:

means for processing the symptomatic arrays in an element-wise manner to produce a composite symptomatic array; and means for generating the estimate from the composite symptomatic array.

57. A bit error rate estimation module as claimed in claim 56, wherein the means for generating the estimate from the composite symptomatic array comprises means for computing a function of the composite symptomatic array and a pre-determined vector associated with a known error rate.

58. A bit error rate estimation module as claimed in claim 57, wherein the means for computing a function is operative to:

shift the composite symptomatic array until it is substantially close to the pre-determined vector; and set the error rate estimate equal to the known error rate multiplied by an exponential function of the number of positions by which the composite symptomatic array was shifted.

59. A bit error rate estimation module as claimed in claim 57, wherein the means for computing a function is operative to:

shift the pre-determined vector until it is substantially close to the composite symptomatic array; and set the error rate estimate equal to the known error rate multiplied by an exponential function of the number of positions by which the pre-determined vector was shifted.

60. A bit error rate estimation module as claimed in claim 56, wherein the means for generating the estimate from the composite symptomatic array comprises:

means for comparing the composite symptomatic array to a set of pre-determined vectors associated with respective error rates; and means for choosing as the error rate estimate the error rate associated with the pre-determined vector being closest to the composite symptomatic array.

61. A bit error rate estimation module as claimed in claim 56, wherein the means for generating the estimate from the composite symptomatic array is operative to compute a function of the elements of the composite symptomatic array.

62. A bit error rate estimation module as claimed in claim 56, wherein the means for generating the estimate from the composite symptomatic array is operative to:

generate a weight vector as a function of the composite symptomatic array; and compute a function of the weight vector and of the composite symptomatic array.

63. A bit error rate estimation module as claimed in claim 62, wherein said function of the weight vector and of the composite symptomatic array is the dot product.

\* \* \* \* \*